US012246462B2

(12) United States Patent
Jang et al.

(10) Patent No.: US 12,246,462 B2
(45) **Date of Patent: *Mar. 11, 2025**

(54) RAZOR ASSEMBLY FOR RAZOR WITH INDUCTION HEATING SYSTEM

(71) Applicant: DORCO CO., LTD., Seoul (KR)

(72) Inventors: Sejun Jang, Seoul (KR); Youngjin Lee, Seoul (KR); Sung Hee Son, Seoul (KR); Hyo Sun Ahn, Seoul (KR)

(73) Assignee: DORCO CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/360,308

(22) Filed: Jul. 27, 2023

(65) Prior Publication Data

US 2023/0364816 A1 Nov. 16, 2023

Related U.S. Application Data

(63) Continuation of application No. 17/447,168, filed on Sep. 8, 2021, now Pat. No. 11,745,370, which is a continuation-in-part of application No. 16/567,999, filed on Sep. 11, 2019, now Pat. No. 11,123,890.

(51) Int. Cl.
*B26B 21/48* (2006.01)
*B26B 21/52* (2006.01)

(52) U.S. Cl.
CPC ............ *B26B 21/48* (2013.01); *B26B 21/521* (2013.01); *B26B 21/526* (2013.01)

(58) Field of Classification Search
CPC ... B26B 21/48; B26B 21/222; B26B 21/4018; F26B 23/347; F26B 23/04
See application file for complete search history.

(56) References Cited

U.S. PATENT DOCUMENTS

| | | | |
|---|---|---|---|
| 5,065,515 | A | 11/1991 | Iderosa |
| 5,653,025 | A | 8/1997 | Cheng et al. |
| 5,687,485 | A | 11/1997 | Shurtleff et al. |
| 5,761,814 | A | 6/1998 | Anderson et al. |
| 5,956,848 | A | 9/1999 | Tseng et al. |
| 5,956,851 | A | 9/1999 | Apprille et al. |
| 6,041,926 | A | 3/2000 | Petricca et al. |

(Continued)

FOREIGN PATENT DOCUMENTS

| | | | | |
|---|---|---|---|---|
| CN | 101306537 | A * | 11/2008 | B26B 21/48 |
| CN | 112621821 | A * | 4/2021 | B26B 21/14 |

(Continued)

OTHER PUBLICATIONS

CN-101306537-A English Translation; Nov. 19, 2008; Sun, Xiaosong.*

(Continued)

*Primary Examiner* — Laura M Lee
(74) *Attorney, Agent, or Firm* — Knobbe, Martens, Olson, & Bear, LLP

(57) ABSTRACT

A razor assembly is proposed. The razor assembly may include a cartridge including at least one blade, and a handle assembly. The handle assembly may include a handle top part positioned at an upper part in an extending direction of the handle assembly. The handle assembly may also include a heating element configured to simultaneously heat the handle top part and the at least one blade in a contactless manner.

10 Claims, 14 Drawing Sheets

(56) References Cited

U.S. PATENT DOCUMENTS

| | | | |
|---|---|---|---|
| 6,052,903 A | 4/2000 | Metcalf et al. | |
| 6,185,822 B1 | 2/2001 | Tseng et al. | |
| 6,212,777 B1 | 4/2001 | Gilder et al. | |
| 6,442,839 B1 | 9/2002 | Tseng et al. | |
| 6,516,518 B1 | 2/2003 | Garraway et al. | |
| 6,612,040 B2 | 9/2003 | Gilder | |
| 6,684,513 B1 | 2/2004 | Clipstone et al. | |
| 8,061,041 B2 | 11/2011 | Jessemey et al. | |
| 8,533,958 B2 | 9/2013 | Tomassetti et al. | |
| 9,440,366 B2 | 9/2016 | Tomassetti et al. | |
| 9,751,229 B2 | 9/2017 | Hodgson | |
| 10,894,330 B2 | 1/2021 | Goeder et al. | |
| 11,389,982 B2 * | 7/2022 | Beerwerth | A45D 44/00 |
| 2002/0149890 A1 | 10/2002 | Kaneko et al. | |
| 2005/0189338 A1 | 9/2005 | Sukeforth | |
| 2007/0234577 A1 | 10/2007 | Masek et al. | |
| 2009/0255123 A1 | 10/2009 | Tomassetti et al. | |
| 2009/0282693 A1 | 11/2009 | Kitamura et al. | |
| 2012/0227265 A1 | 9/2012 | Tomassetti et al. | |
| 2012/0248882 A1 | 10/2012 | Urano | |
| 2014/0155812 A1 | 6/2014 | Lauber | |
| 2015/0135538 A1 | 5/2015 | Tomassetti et al. | |
| 2015/0174774 A1 * | 6/2015 | Hodgson | B26B 21/4018 30/34.2 |
| 2015/0298326 A1 | 10/2015 | Tomassetti et al. | |
| 2017/0348866 A1 | 12/2017 | Psimadas et al. | |
| 2018/0126572 A1 * | 5/2018 | Tomassetti | B26B 21/48 |
| 2018/0207822 A1 | 7/2018 | Fuerst et al. | |
| 2019/0299465 A1 | 10/2019 | Gester et al. | |
| 2019/0299466 A1 | 10/2019 | Goeder et al. | |
| 2019/0299472 A1 | 10/2019 | Johnson et al. | |
| 2019/0358837 A1 | 11/2019 | Broemse et al. | |
| 2020/0316800 A1 * | 10/2020 | Beerwerth | B26B 19/46 |
| 2021/0069924 A1 | 3/2021 | Jang et al. | |

FOREIGN PATENT DOCUMENTS

| | | | | |
|---|---|---|---|---|
| DE | 8909321 U1 * | 12/1990 | B26B 21/222 |
| EP | 3354425 A1 | 8/2018 | |
| FR | 985030 A | 7/1951 | |
| FR | 2716402 A1 | 8/1995 | |
| IT | 1029228 B | 3/1978 | |
| KR | 2003-11314 Y1 | 4/2003 | |
| KR | 10-2014-0042230 A | 4/2014 | |
| KR | 20160020320 A * | 8/2014 | B26B 21/24 |
| KR | 10-1452271 B1 | 10/2014 | |
| KR | 10-2016-0020320 A | 2/2016 | |

OTHER PUBLICATIONS

DE8909321U1 English translation; Wilkinson Sword; Dec. 20, 1990.*

Office Action dated Sep. 16, 2022 in Korean Application No. 10-2020-0101811, in 5 pages.

Office Action dated Aug. 25, 2020 in U.S. Appl. No. 16/567,999, in 18 pages.

Final Office Action dated Feb. 12, 2021 in U.S. Appl. No. 16/567,999, in 13 pages.

Search Report dated Jan. 25, 2021 in European Application No. 20190427.3, in 8 pages.

Office Action dated Aug. 5, 2022 in U.S. Appl. No. 17/447,168.

Final Office Action dated Feb. 9, 2023 in U.S. Appl. No. 17/447,168.

* cited by examiner

RAZOR ASSEMBLY FOR RAZOR WITH INDUCTION HEATING SYSTEM

CROSS-REFERENCE TO RELATED APPLICATION(S)

This application is a continuation of U.S. patent application Ser. No. 17/447,168, filed on Sep. 8, 2021, which is a continuation-in-part of U.S. patent application Ser. No. 16/567,999, filed on Sep. 11, 2019, now U.S. Pat. No. 11,123,890, issued Sep. 21, 2021, the contents of each of which are hereby incorporated by reference herein in their entireties.

BACKGROUND

Technical Field

The present disclosure relates to a razor and handle assembly for a razor, and more particularly, to a razor and handle assembly having an induction heating system for heating a razor cartridge.

Description of Related Technology

Generally, hot water or a hot towel is applied to an area of a face prior to shaving. These steps are done because hairs are softened by heating and the razor blade glides more easily when shaving.

SUMMARY

According to at least one embodiment, the present disclosure provides a razor assembly, comprising: a cartridge including at least one blade; and a handle assembly, wherein the handle assembly includes: a heating bar disposed on the handle assembly; at least one induction coil which is disposed under the heating bar and configured to heat the heating bar in a contactless manner; and a grip portion.

DETAILED DESCRIPTION

Figure 1A:
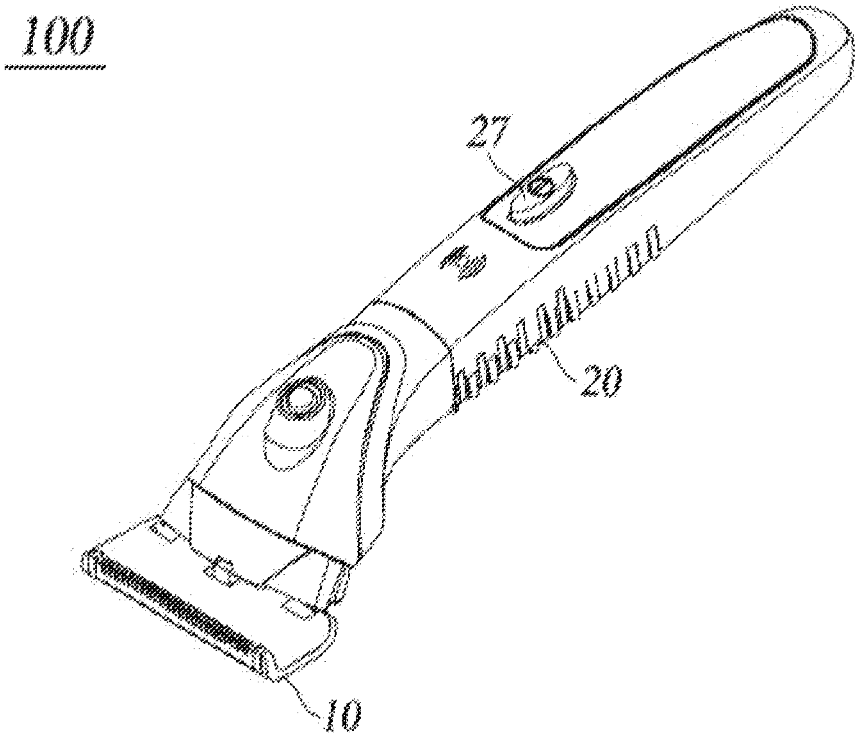
FIG. 1A is a top perspective view of a razor assembly according to an embodiment of the present disclosure.

During shaving, the razor blade may be rinsed with water to remove cut hairs and other debris, as well as shaving cream/gel/foam. Hot water may also be more effective than cold water when the razor blade is rinsed, allowing for more comfortable shaving. However, electric heating of a razor may be subject to a high risk of electric shock and high possibility of malfunction because the razor is often used in wet conditions. Therefore, there is a need to devise a razor having a heating system capable of safely heating a razor cartridge or blade(s) during use.

Advantages and features of the present disclosure and a method of achieving the same should become clear with embodiments described in detail below with reference to the accompanying drawings. However, the present disclosure is not limited to embodiments disclosed below and may be realized in various other forms. The present embodiments make the disclosure complete and are provided to completely inform one of ordinary skill in the art to which the present disclosure pertains of the scope of the disclosure. The present disclosure is defined only by the scope of the claims. Like reference numerals refer to like elements throughout.

Unless otherwise defined, all terms including technical and scientific terms used herein have the same meaning as commonly understood by one of ordinary skill in the art to which the present disclosure pertains. Terms, such as those defined in commonly used dictionaries, are not to be construed in an idealized or overly formal sense unless expressly so defined herein.

Terms used herein are for describing the embodiments and are not intended to limit the present disclosure. In the present specification, a singular expression includes a plural expression unless the context clearly indicates otherwise.

"Comprises" and/or "comprising" used herein do not preclude the existence or the possibility of adding one or more elements other than those mentioned.

In general, a razor assembly according to various embodiments of the present disclosure has an induction coil causing high frequency induction heating such that a cartridge portion of the razor assembly is heated. For example, the cartridge portion may be heated up to about 45° C. or 45° C.±8. Alternatively, the cartridge portion may be heated up to about 55° C. or 55° C.±8. Since the heated portion of the razor assembly is designed to be in contact with a user's skin, the temperature should not be too hot. In general, the temperature is in the range of 37° C. to 63° C. to provide comfortable feeling to the user's skin.

A temperature controller may be provided such that the cartridge portion can be heated to different temperatures as desired by a user. For example, the heating temperature may be settable to at least two or three different temperatures by the user. Moreover, the induction heating may be designed to achieve the set heating temperature in less than 10 seconds, preferably in less than 5 seconds, so that no waiting is required for the heating.

Once the cartridge portion is heated up to the set temperature, the temperature needs to be maintained stably to provide a comfortable shaving experience to the user. For example, the temperature of the heated cartridge portion is controlled such that the set temperature is maintained for at least 10 minutes once the set temperature is achieved. In another example, the induction heating is controlled such that the temperature of the heated cartridge portion is maintained within the range of ±3° C. from the set temperature during the heating. Further, the induction heating is controlled such that the temperature of the cartridge portion does not go over a set maximum temperature during the heating by controlling a circuit for the induction heating. Furthermore, the induction heating may be automatically stopped for safety when a preset period of time passes after the cartridge portion is heated or when the temperature is more than a threshold temperature.

Further, the induction coil may be provided at a handle portion or handle assembly of the razor assembly such that a magnetic field generated by the induction coil penetrates an electrically conducting object, for example, at least a blade, included in the cartridge portion without requiring the induction coil to physically or electrically contact the cartridge portion. Thus, there is no circuit required in the razor assembly for electrically connecting the cartridge portion to a power source. For example, a distance between the blade and the induction coil may be in the range of about 0.01~4 cm. Preferably, the distance between the blade and the induction coil may be less than 3 cm. More preferably, the distance between the blade and the induction coil may not be more than 2 cm. The distance may vary depending on where the induction coil is located in the handle assembly. Thicker or heavier induction coils may be used as the distance between the blade and the induction coil increases to compensate for a reduced magnetic field.

Such a structure of the razor assembly according to various embodiments of the present disclosure reduces exposure of metal portions, thus, improving durability and safety of the razor assembly by eliminating potential factors such as corrosion, leakage, and malfunction that may affect the overall quality of the razor assembly. Moreover, by providing heat to the cartridge portion, which may be easily detached from the handle portion, a user is provided with comfort when shaving is performed with the razor assembly.

Figure 1B:
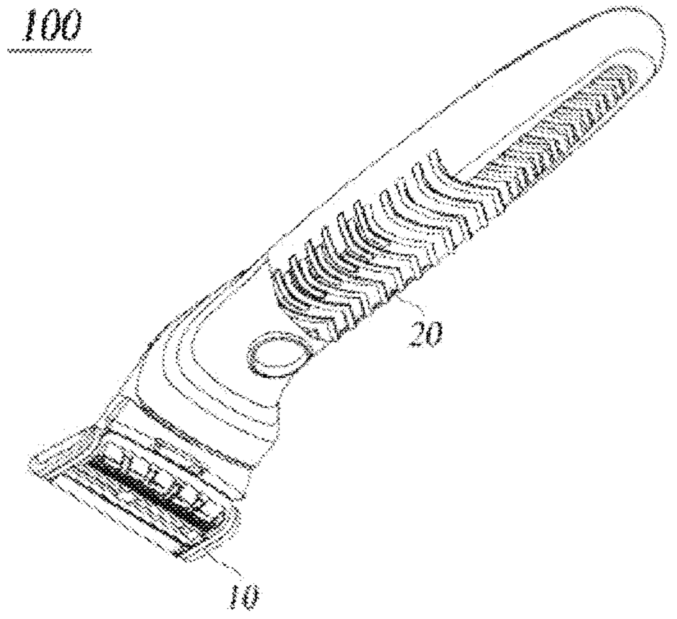
FIG. 1B is a bottom perspective view of a razor assembly according to an embodiment of the present disclosure.
Figure 2A:
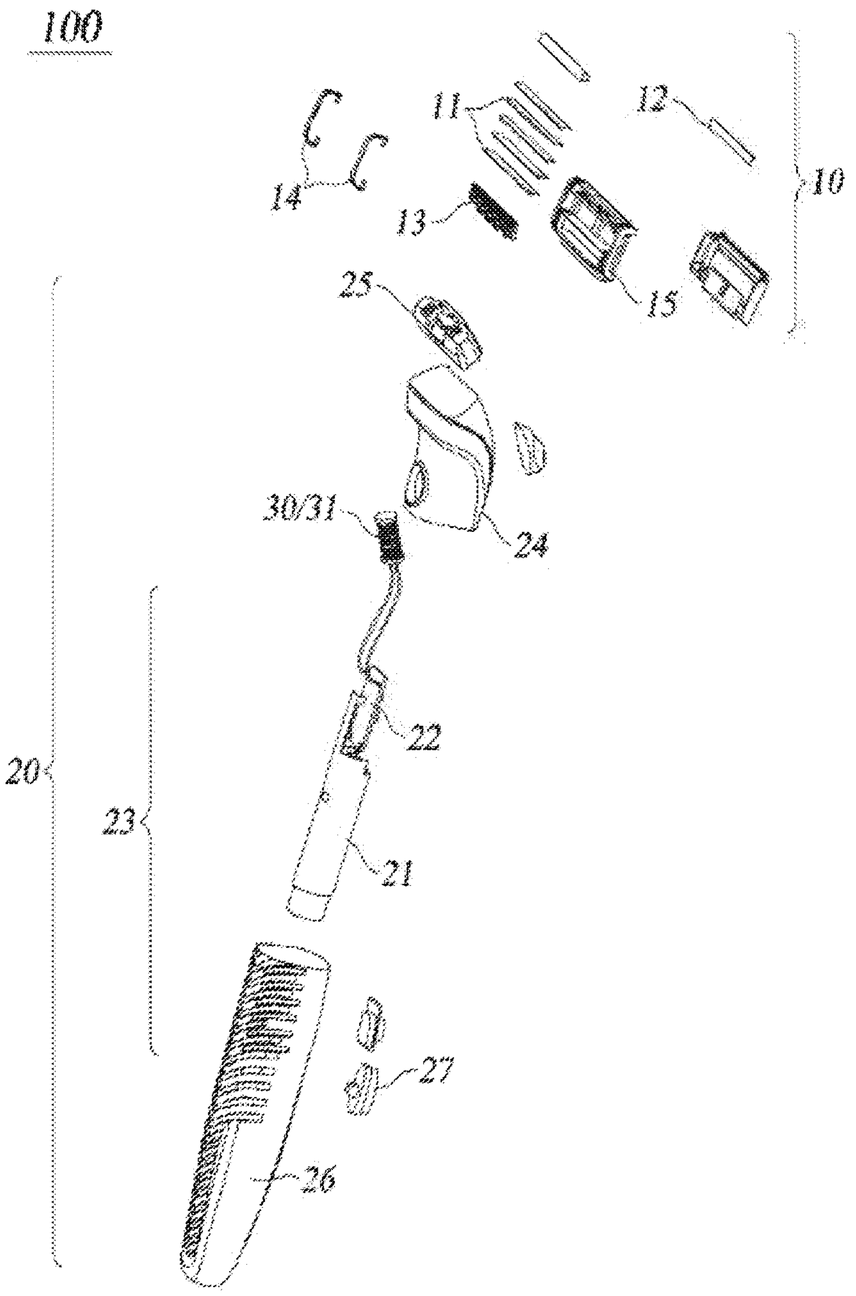
FIG. 2A is an exploded view of a razor assembly according to an embodiment of the present disclosure.
Figure 2B:
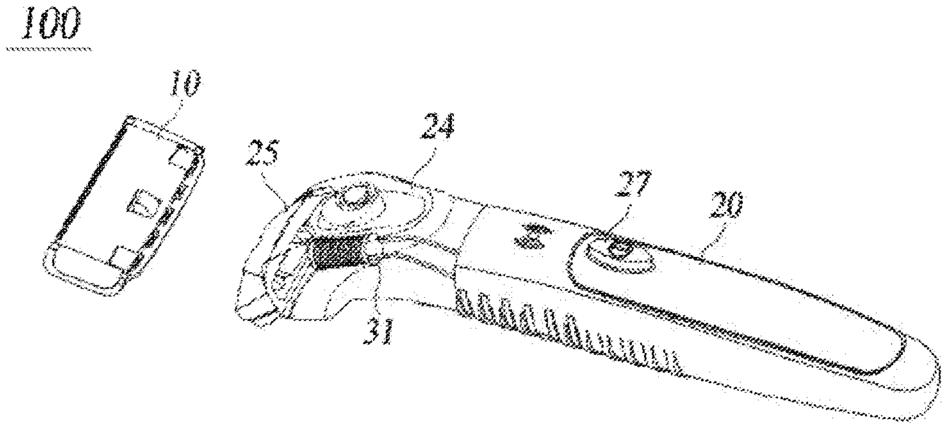
FIG. 2B is a perspective view of a razor assembly according to an embodiment of the present disclosure in which a cartridge is separated from a connector coupled to a handle.
Figure 3A:
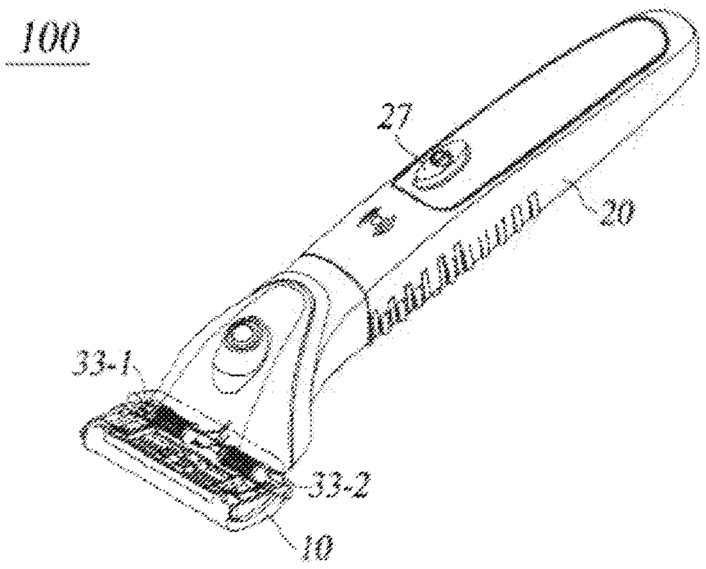
FIG. 3A is a top perspective view of a razor assembly according to another embodiment of the present disclosure.
Figure 3B:
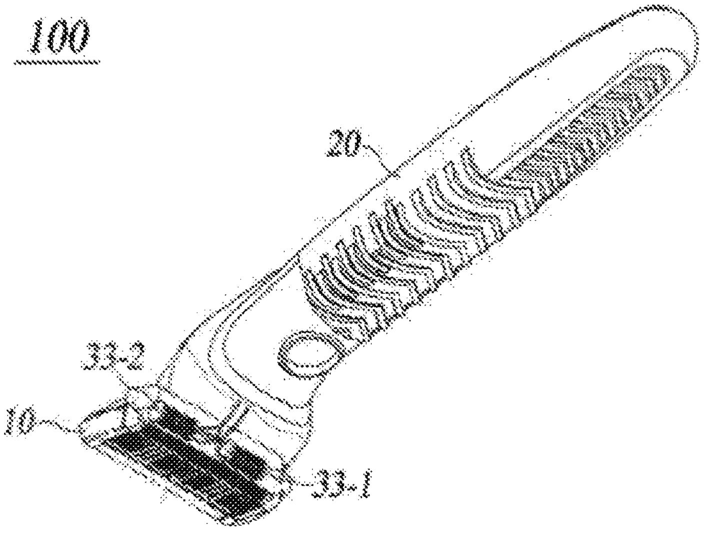
FIG. 3B is a bottom perspective view of a razor assembly according to another embodiment of the present disclosure.
Figure 4A:
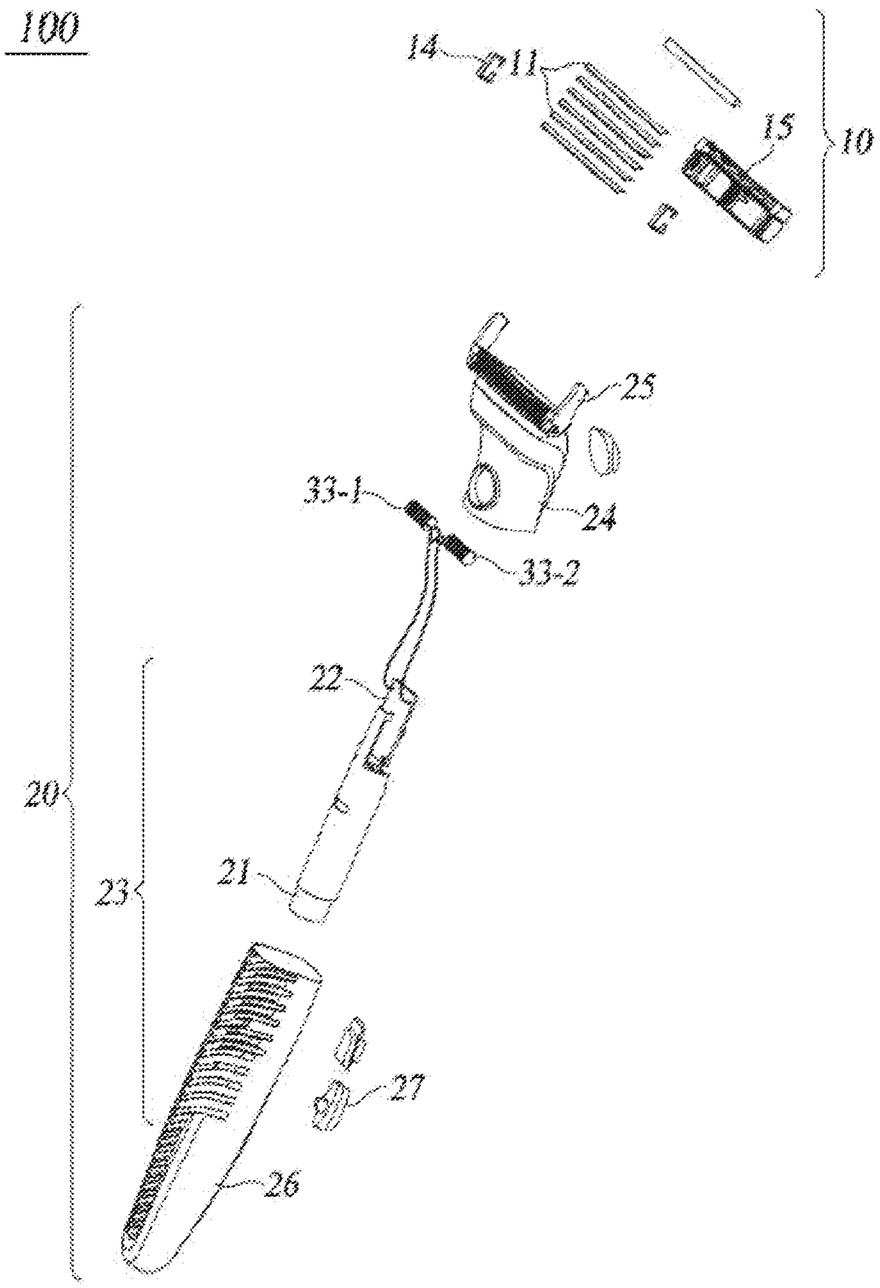
FIG. 4A is an exploded view of a razor assembly according to another embodiment of the present disclosure.
Figure 4B:
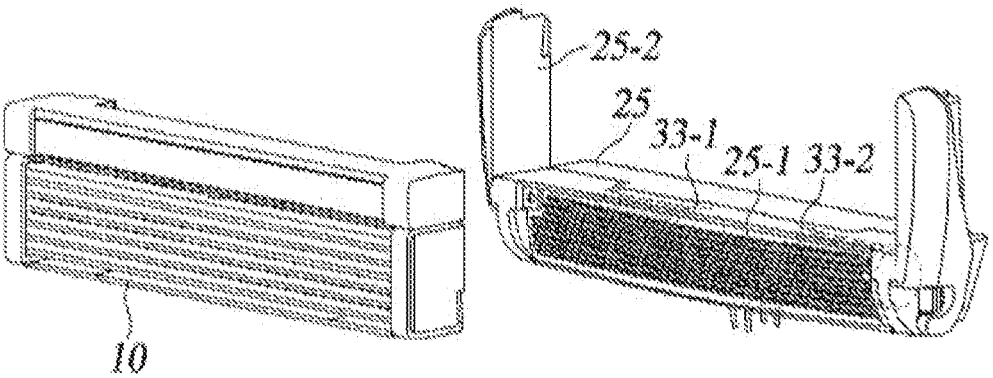
FIG. 4B is a perspective view of a connector and a cartridge of a razor assembly according to an embodiment of the present disclosure in which the cartridge is separated from the connector.
Figure 4C:
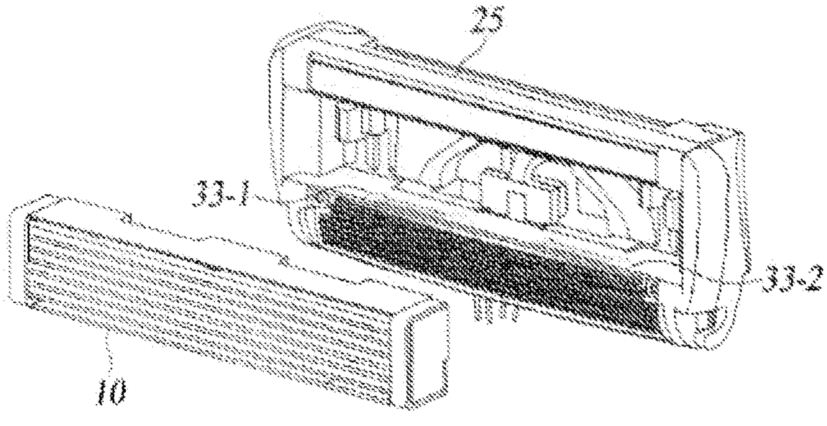
FIG. 4C is a perspective view of a connector and a cartridge of a razor assembly according to another embodiment of the present disclosure in which the cartridge is separated from the connector.
Figure 4D:
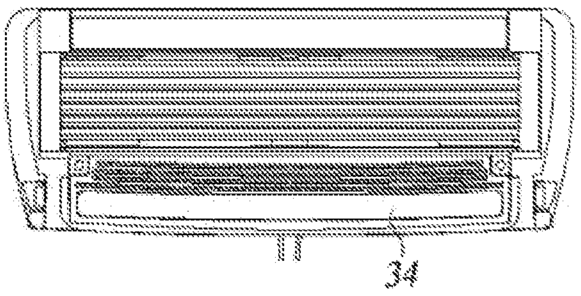
FIG. 4D is a perspective view of a connector and a cartridge of a razor assembly according to one embodiment of the present disclosure in which the cartridge is coupled to the connector.
Figure 4E:
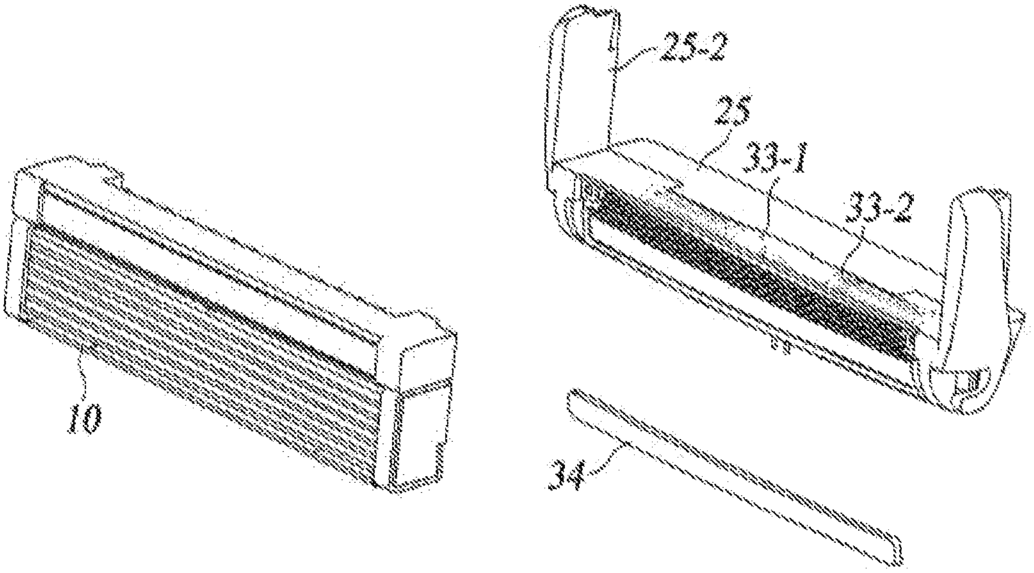
FIG. 4E is an exploded view of a connector and a cartridge of a razor assembly according to one embodiment of the present disclosure.
Figure 5A:
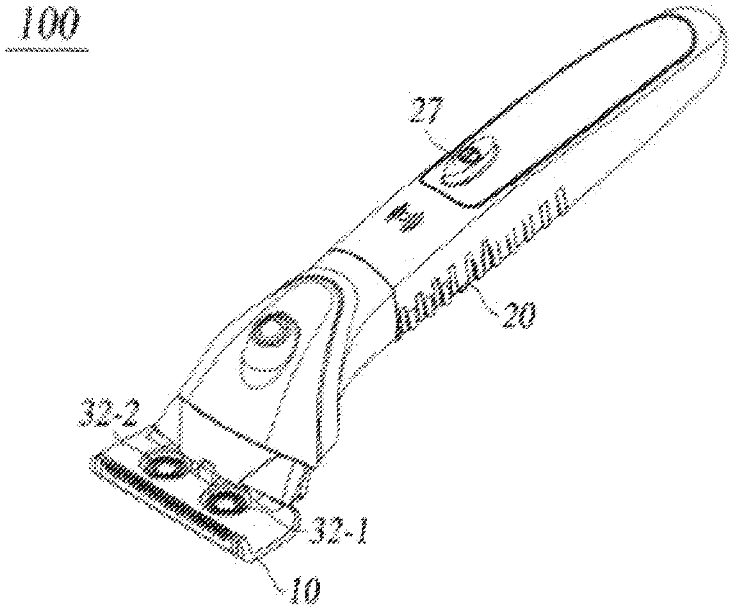
FIG. 5A is a top perspective view of a razor assembly according to yet another embodiment of the present disclosure.
Figure 5B:
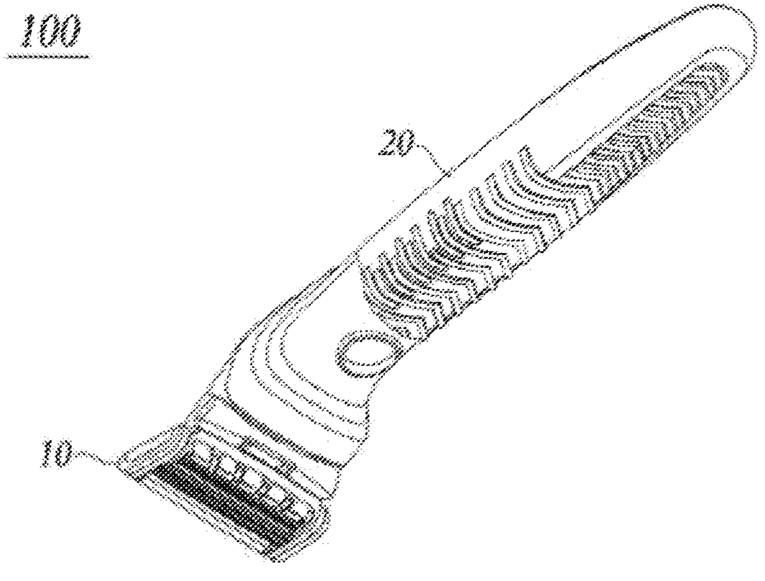
FIG. 5B is a bottom perspective view of a razor assembly according to yet another embodiment of the present disclosure.
Figure 6A:
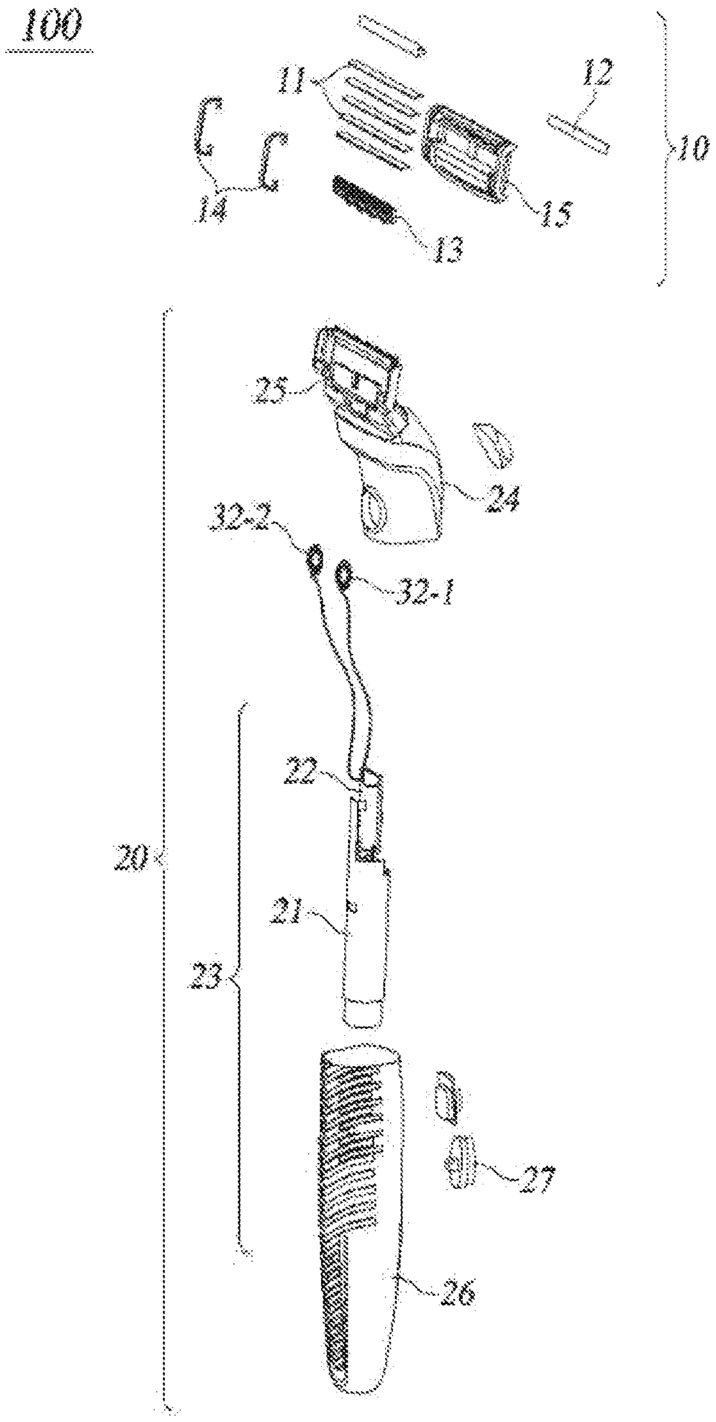
FIG. 6A is an exploded view of a razor assembly according to yet another embodiment of the present disclosure.
Figure 6B:
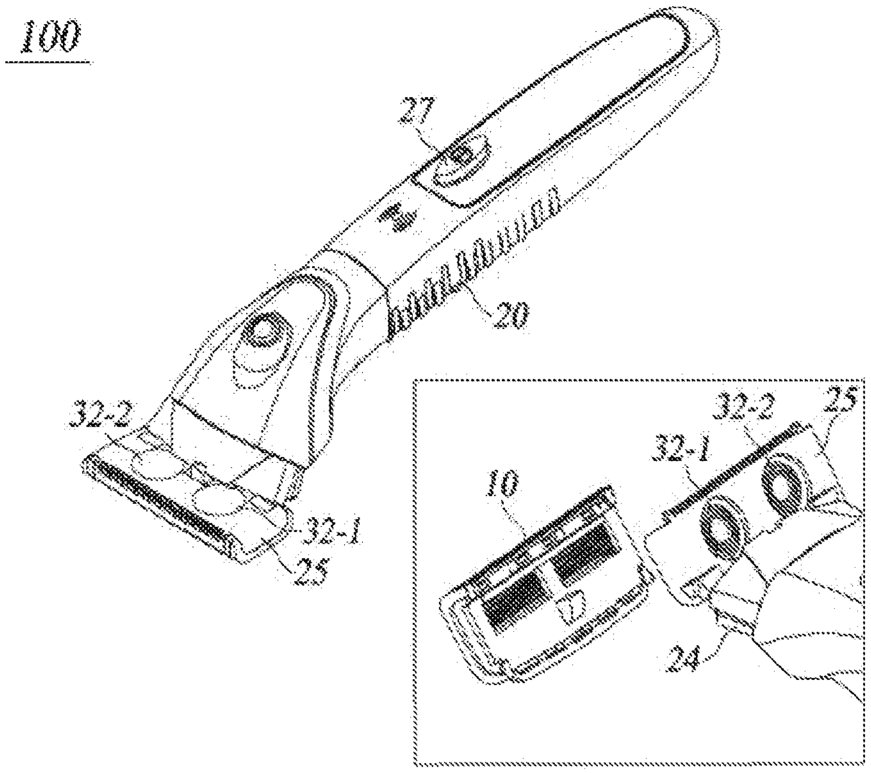
FIG. 6B includes a perspective view of a razor assembly according to yet another embodiment of the present disclosure in which induction coils are located at a handle assembly.

Hereinafter, an embodiment of the present disclosure will be described in detail with reference to the accompanying drawings. FIG. 1A is a top perspective view of a razor assembly 100 according to an embodiment of the present disclosure. FIG. 1B is a bottom perspective view of a razor assembly 100 according to an embodiment of the present disclosure. FIG. 2A is an exploded view of a razor assembly 100 according to an embodiment of the present disclosure. FIG. 2B is a perspective view of a razor assembly 100 according to an embodiment of the present disclosure in which a cartridge 10 is separated from a connector 25 coupled to a handle assembly 20.

In one embodiment of the present invention, the connector 25 may be integrated into the cartridge 10. In another embodiment of the present invention, the connector 25 may be detachable from the handle assembly 20.

Referring to FIGS. 1A-2B, according to an embodiment of the present disclosure, the razor assembly 100 includes a cartridge 10 including a blade housing 15 with at least one blade 11 and a handle assembly 20 including an electric power source 21 and a printed circuit board (PCB) 22 electrically coupled to the electric power source 21. The handle assembly 20 further includes a power ON/OFF switch button 27 to activate/deactivate the PCB 22. The razor assembly 100 further includes at least one induction coil 30 located at the handle assembly 20 to cause induction heating of the cartridge 10 when the power ON/OFF switch button 27 is in an ON position.

In one embodiment, the at least one induction coil 30 is made of copper or other metals. Further, the at least one induction coil 30 may be wound around a core according to an embodiment of the present invention. However, the core may not be required according to another embodiment of the present invention.

In one embodiment, the power ON/OFF switch button 27 may also be used as a temperature controller once the power is on. For example, once the power ON/OFF switch button 27 is in the ON position, the heating temperature may be set to a default temperature. Thereafter, when another input is received via the ON/OFF switch button 27, for example, holding the ON/OFF switch button 27 for a preset period of time, for example 3 seconds, the default temperature is changed to another temperature. In one embodiment, there may be at least two or more preset temperatures available for temperature setting such that the temperature is changed to one of the at least two or more preset temperatures in order in response to each input for changing the temperature received via the ON/OFF switch button 27. Alternatively, there may be a separate input unit or button provided for a temperature controller in addition to the power ON/OFF switch button 27.

The electric power source 21, the PCB 22, and the induction coil 30 may be encapsulated within the handle assembly 20 such that water cannot access the inside of the handle assembly 20. That is, the handle assembly 20 is completely waterproof. For example, the electric power source 21 may be an internal battery that is replaceable and/or chargeable. In one embodiment, the electric power source 21 may be charged wirelessly without taking it out from the handle assembly 20. In other embodiments, the electric power source 21 may be configured to be coupled to an exterior of the handle assembly 20 while maintaining a water tight seal to other components.

The at least one induction coil 30 is coupled to the PCB 22 such that an electrically conducting object, usually a metal, included in the cartridge 10, is heated by electromagnetic induction. The entire area or only partial area(s) of the cartridge 10 may be heated according to the design of the cartridge based on where the conducting object is located in the cartridge. Thus, the at least one induction coil 30 is configured to cause at least a portion, for example, at least the blade 11, of the cartridge 10, which is detachably coupled to the handle assembly 20, to be heated in a non-contact manner. Further, depending on where in the cartridge 10 the electrically conducting object is located, different portions of the cartridge 10 may be heated, and thus, various types of cartridges 10 having different heated portions may be designed.

In one embodiment, there is no conductive material or electrically conducting object present in the handle assembly 20, in which the at least one induction coil 30 is located, to avoid losing electromagnetic induction capacity. Further, a blocking material may be present between the at least one induction coil 30 and an electrically conducting object if the electrically conducting object is present in the handle assembly 20 to avoid losing electromagnetic induction capacity to the electrically conducting object within the handle object 20.

The handle assembly 20 further includes a handle 23, a head portion 24 coupled to the handle 23, and a grip portion 26. According to an embodiment of the present disclosure, the electric power source 21 and the PCT 22 are located inside the handle 23, and the at least one induction coil 30 is located at the head portion 24. See FIGS. 2A and 2B.

According to one aspect of the present disclosure, the at least one induction coil 30 located at the head portion 24 may have a cylindrical shape and the cylindrical shaped induction coil 31 is arranged in a lengthwise direction of the handle 23 that is perpendicular to a lengthwise direction of the at least one blade 11, as shown in FIG. 2A. However, the shape of the induction coil 30 is not limited to the cylindrical shaped induction coil 31 and the induction coil 30 may be formed in a non-cylinder type shape or any type of polyhedron such as a cuboid for example. The cylindrical shaped induction coil 31 and the cartridge 10 are arranged such that an alternating electric field formed by the cylindrical shaped induction coil 31 causes heating of the electrically conducting object in the cartridge 10 most effectively. Although the cylindrical shaped induction coil 31 is not directly coupled to the cartridge 10, at least a portion of the cartridge 10 is heated by electromagnetic induction, whereby heat is generated in the cartridge 10 by eddy currents in a conductive material.

In one embodiment, the handle assembly 20 further includes a connector 25 having a first side coupled to the head portion 24 and a second side coupled to the cartridge 10. The cartridge 10 may be detachable from the connector 25 to allow replacement of the cartridge. Thus, the connector 25 may be located between the cartridge 10 and the cylindrical shaped induction coil 31. The handle assembly 20 and induction coil 30 may be configured such that the cartridge 10 may still be heated by induction heating even with the connector 25 interposed and without requiring direct electrical contact between the cartridge 10 and the head portion 24 or handle 23 where the power source 21 is located.

For example, the distance between the induction coil 30 and the cartridge 10 or the at least one blade 11 may be up to 4 cm. Preferably, the distance between the induction coil 30 and the cartridge 10 or the at least one blade 11 may be less than 3 cm. More preferably, the distance between the induction coil 30 and the cartridge 10 or the at least one blade 11 may not be more than 2 cm.

It is noted that the electromagnetic induction capacity may be reduced if the distance between the induction coil 30 and the cartridge 10 or the at least one blade 11 is too large. Thus, the razor assembly 100 needs to be designed such that the distance between the induction coil 30 and the cartridge 10 or the at least one blade 11 is optimal for the electromagnetic induction capacity generated. In this case, the portion(s) of the cartridge 10 which are heated may be different based on locations of electrically conducting object (s) included in the cartridge 10 because the cartridge 10, in which the at least one blade 11 is fixed, may be made of plastic, metal, other materials, or a combination thereof.

According to one aspect of the present disclosure, the at least one blade 11 is heated by the at least one induction coil 30. The cartridge 10 may further include at least one of a trimmer 12 that may be heated by the induction coil 30; a guard 13 that may be heated by the induction coil 30; or a blade fixation clip 14 configured to hold a plurality of blades 11 and that may be heated by the induction coil 30. Therefore, there may be various types of cartridges 10 having different heated portions. In some embodiments, one or more elements of the cartridge 10 may not be made of a conductive material, and instead may be made of a non-conductive material, such as rubber or plastic. However, such non-conductive elements may be configured and positioned adjacent to other conductive elements of the cartridge 10 such that the non-conductive elements may also be heated by their proximity to the conductive elements which are induction heated by the induction coil 30.

For example, the guard 13 may be composed of a rubber material, and it may be positioned on top of or otherwise in contact with a metallic frame member or other conductive element(s) of the cartridge 10. When the metallic frame or conductive element(s) of the cartridge 10 is heated by induction from the induction coil 30, the guard 13 may also be indirectly heated even if the guard 13 does not include any conductive materials.

In one embodiment, the guard 13 may include a metal portion. In this case, the at least one induction coil 30 is configured to cause the guard 13 placed on the cartridge 10 to be heated in a non-contact manner such that the skin of the user is heated by the heated guard 13.

For example, one type of the cartridge 10 may be configured such that the entire cartridge 10 is heated by the induction coil 30. In another example, the cartridge 10 is configured such that only a particular element, such as the guard 13 and/or the at least one blade 11, is heated by the induction coil 30, or such that only the at least one blade 11 is heated by the induction coil 30. According to one embodiment, different types of cartridges 10 may be available to be used with the handle assembly 20, allowing the user to select a desired type of cartridge.

According to another aspect of the present disclosure, a handle assembly 20 configured to be coupled to a razor cartridge 10 includes an electric power source 21 and at least one induction coil 30 electrically coupled to the electric power source, the at least one induction coil 30 generating a magnetic force for heating at least a portion of the razor cartridge 10 by induction heating. The handle assembly 20 may be coupled to any type of razor cartridges 10 that are compatible with the handle assembly 20. In one embodiment, the handle assembly 20 may further include a handle 23, a head portion 24, a grip portion 26, and a connector 25 having a first side coupled to the head portion 24 and a second side configured to be coupled to the razor cartridge 10.

In one embodiment, the at least one induction coil 30 may be located at the head portion 24 of the handle assembly 20. Alternatively, the at least one induction coil 30 may be located at the connector 25. In some embodiments, different types of compatible cartridges 10 may be used for different types of handle assemblies 20 based on the location of the at least one induction coil 30, either at the head portion 24 or at the connector 25. In other embodiments, the same cartridge 10 may be compatible with all types of handle assemblies 20 of the present disclosure, regardless of the location of the induction coil 30.

Referring to FIGS. 3A-4E, according to another embodiment of the present disclosure, the at least one induction coil 30 may have a cylindrical shaped induction coil 33. However, the shape of the induction coil 30 is not limited to the cylindrical shaped induction coil 33 and the induction coil 30 may be formed in a non-cylinder type shape or any type of polyhedron such as a cuboid for example.

In one embodiment, the connector 25 may include at least a base portion 25-1 at which at least one induction coil 30 is located and optionally at least one securing member 25-2 which is formed at a lateral side of the base portion. The connector 25 may further include a receiving portion configured to accommodate the cartridge 10 secured to the base portion 25-1 by means of the at least one securing member 25-2. For example, the connector 25 may include the base portion 25-1 and two securing members 25-2 respectively extending from opposite ends of the base portion 25-1 to form the receiving portion configured to receive the cartridge 10, as exemplified in FIG. 4B. In another embodiment, the connector 25 may further include a top portion in addition to the base portion 25-1 and two securing members 25-2 such that the cartridge 10 received at the receiving portion of the connector 25 is surrounded by four sides of the connector, as exemplified in FIG. 4C.

Although the shape of the receiving portion is different between the two embodiments described in the above paragraph, in both embodiments, the cartridge 10 received at the receiving portion of the connector 25 is secured between the two securing members 25-2. Further, as exemplified in FIGS. 3A-3C, the at least one induction coil 33 may include a first induction coil 33-1 located at a first or left side of the base portion 25-1 of the connector 25 and a second induction coil 33-2 located at a second or right side of the base portion 25-1 of the connector 25, wherein the first side and second side of the base portion are on opposite sides of the base portion with respect to the handle 23. However, a number of the at least one induction coil 33 located at the connector 25 is not limited to two and the number may be less or more than two. Also, a number and a position of the securing member 25-2 is not limited to the embodiment exemplified in the drawings.

Furthermore, the first induction coil 33-1 and the second induction coil 33-2 may be arranged along a lengthwise direction of the base portion 25-1 of the connector 25 to be parallel with a lengthwise direction of the at least one blade 11 of the cartridge 10. In yet other embodiments, other configurations are considered, including a single induction coil 30 or more than one induction coils 30 located at a portion of the connector 25 other than the base portion 25-1. The first induction coil 33-1 and the second induction coil 33-2 are arranged such that the cartridge 10 received at the receiving portion of the connector 25 is in close proximity to the first induction coil 33-1 and the second induction coil 33-2. Such an arrangement will allow formation of an alternating electric field by the first induction coil 33-1 and the second induction coil 33-2 such that the electrically conducting object in the cartridge 10 is heated most effectively.

Although not shown in drawings, according to an embodiment, the connector 25 may have a base portion without having two securing members extending therefrom, the base portion having cylindrical coils therein. In such an embodiment, the cartridge 10 may be secured to the base portion 25-1 via a securing means such as a clip. In yet another embodiment, the connector 25 may not include the base portion and the cartridge 10 may be secured directly to the connector via a securing means other than the base portion, and the at least one induction coil 30 may be located at the connector 25.

Further, according to an embodiment, a cartridge 10 may be coupled to a connector 25 having a guard similar to the guard 13 of the cartridge 10. In one embodiment, the guard of the connector 25 may be composed of a rubber material. In another embodiment, the guard of the connector 25 may include a metal portion 34 or other heat conductive material, as exemplified in FIGS. 4D and 4E, such that efficiency of heating of the skin of the user is further improved. For example, the guard of the connector 25 and/or the metal portion 34 may be located in front of or in proximity to the first and second induction coils 33-1 and 33-2 such that heating of the guard/metal portion 34 by electromagnetic induction is further improved.

Referring to FIGS. 5A-6B, according to yet another embodiment of the present disclosure, the handle assembly 20 may further include a handle 23; a head portion 24 coupled to the handle 23; and a connector 25 having a first side coupled to the head portion 24 and a second side configured to be detachably coupled to the cartridge 10, and the at least one induction coil 30 is located at the connector 25. The connector 25 may include one or more induction coils 30. In this embodiment, the two induction coils 32-1 and 32-2 are circular fan-type induction coils, as exemplified in FIGS. 5A, 6A, and 6B. However, the shape of the induction coils 32-1 and 32-2 is not limited to the circular fan-type, and the shape may be another type. Further, a lengthwise direction of the connector 25 may be perpendicular to a lengthwise direction of the handle 23.

For example, a first induction coil 32-1 may be located at a first side of the connector 25 and a second induction coil 32-2 may be located at a second side of the connector 25, wherein the first side and the second side of the connector 25 are on opposite sides of the connector 25 with respect to the handle 23. According to one aspect of the present disclosure, the first induction coil 32-1 and the second induction coil 32-2 are arranged to face a back side of the cartridge 10, the at least one blade 11 located at a front of the cartridge 10 such that magnetic fields generated by the first and second induction coils 32-1 and 32-2 cause induction heating of the at least one blade 11 or the cartridge 10. However, a number of the at least one induction coil 32-1 and 32-2 located at the connector 25 is not limited to two and the number may be less or more than two.

Referring to FIGS. 7A to 9, the cartridge 10 includes at least one blade 11 in accordance with another embodiment of the present disclosure.

At least one blade 11 may include at least one first blade 11-1 and at least one second blade 11-2 which is disposed behind the first blade 11-1. That is, the first blade 11-1 may be disposed in front of the cartridge 10 relative to the second blade 11-2. In this case, an empty space 16 penetrating the cartridge 10 may be formed between the first blade 11-1 and the second blade 11-2. The empty space 16 may be formed to penetrate the entire cartridge 10, from the front to the rear. However, it is not limited to this, for instance, the empty space 16 may be formed to open only towards the rear of the cartridge when a shaving plane on the front surface of the cartridge 10 corresponding to the empty space 16 has a thin film (not shown).

Here, the shaving plane may be defined as a plane tangent to a guard 13 disposed in front of the cartridge 10 and a cap 17 disposed at the rear of the cartridge.

The first blade 11-1 and the second blade 11-2 may be the same type of blade, but are not limited thereto.

Meanwhile, the cartridge 10 may include a guard 13 disposed in front of the first blade 11-1, a cap 17 disposed behind the second blade 11-2, a trimmer (not shown) disposed in the rear of the cartridge 10, and a blade fixation clip (not shown) which is configured to fix the at least one blade 11.

Here, the front of the cartridge may mean the side facing the cutting edge (not shown) of at least one blade 11, and the rear of the cartridge may mean the side opposite to the front of the cartridge.

Further descriptions of the guard 13, cap 17, trimmer and blade fixation clip are not provided since it may be obvious to those skilled in the art or may be the same as the descriptions in relation to the previous embodiments.

In addition, the cartridge 10 may additionally include a heating frame 18 which is disposed in front of the guard 13. The heating frame 18 will be described further later.

The handle assembly 20 may include a power source (not shown), a PCB (not shown), a head portion 24, a connector 25, a grip portion 26, a power on/off switch button (not shown), a heating bar 28, and an induction coil 33.

Here, it does not necessarily mean that both the head portion 24 and the connector 25 must be included in the handle assembly 20, only the head portion 24 may be included in the handle assembly, and both the head portion 24 and the connector 25 may be configured separately from the handle assembly 20.

Furthermore, except for some special descriptions below, further detailed descriptions of the power source, PCB, head portion 24, grip portion 26, power on/off switch button, and connector 25 are not provided since it may be the same as the descriptions in relation to the previous embodiments.

Figure 7A:
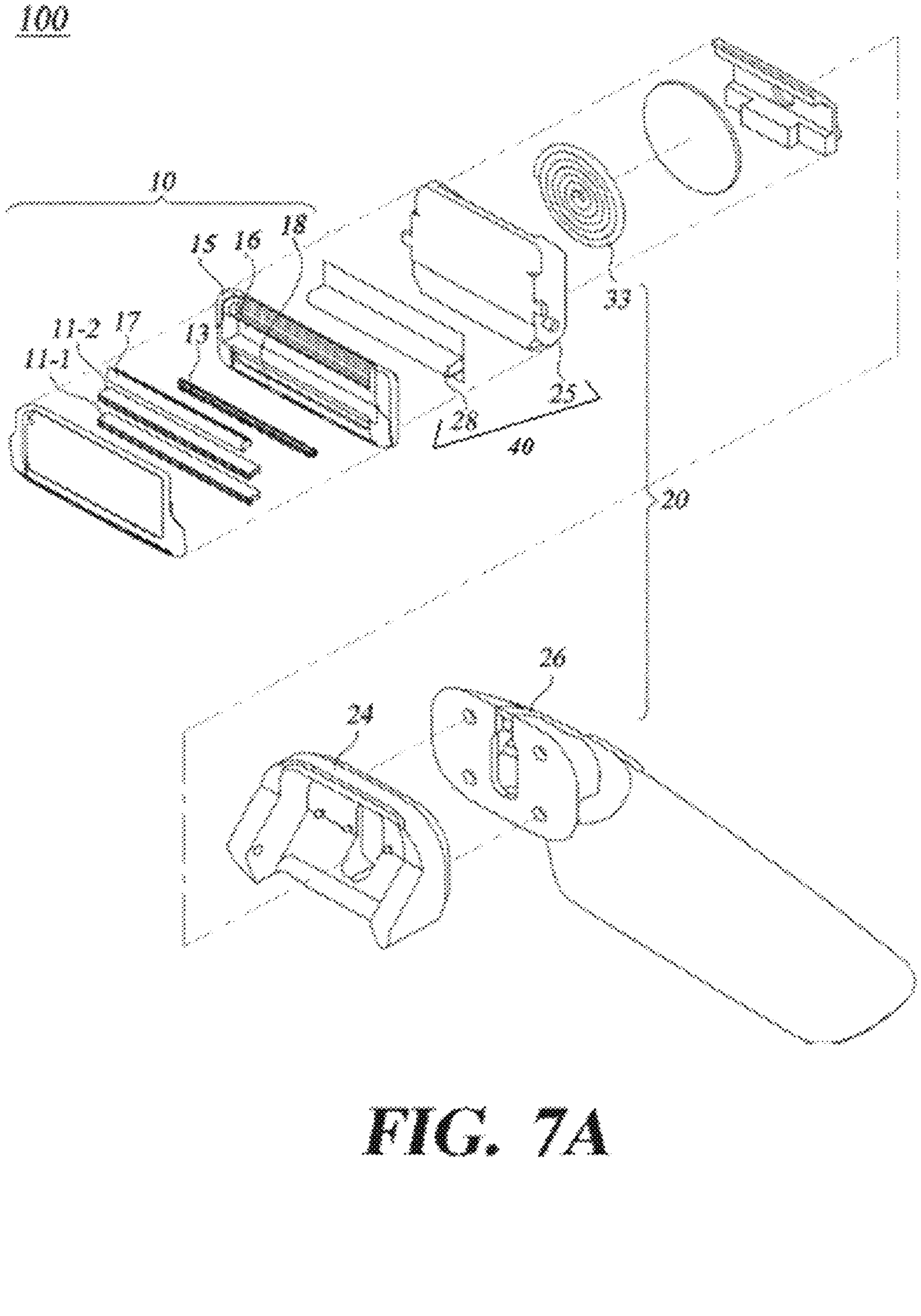
FIG. 7A is an exploded view of the razor assembly in accordance with yet another embodiment of the present disclosure.
Figure 8:
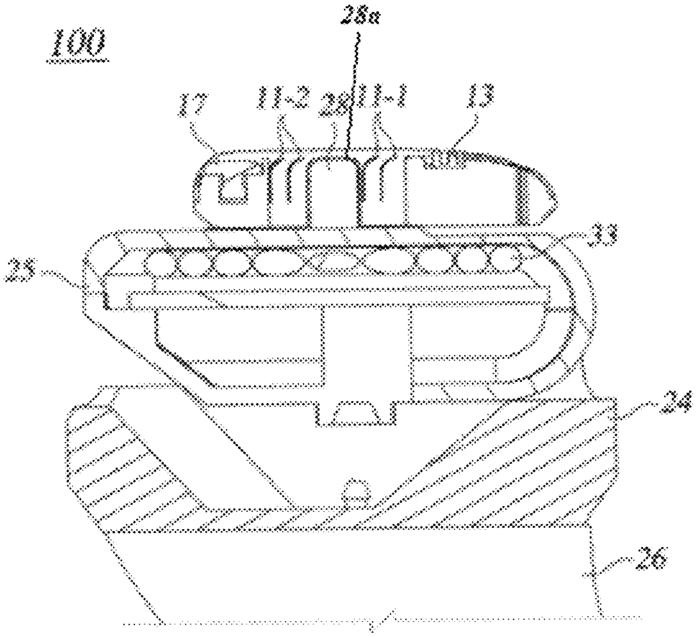
FIG. 8 is a V-V direction cross-sectional view of the razor assembly of FIG. 7B in accordance with yet another embodiment of the present disclosure.
Figure 9:
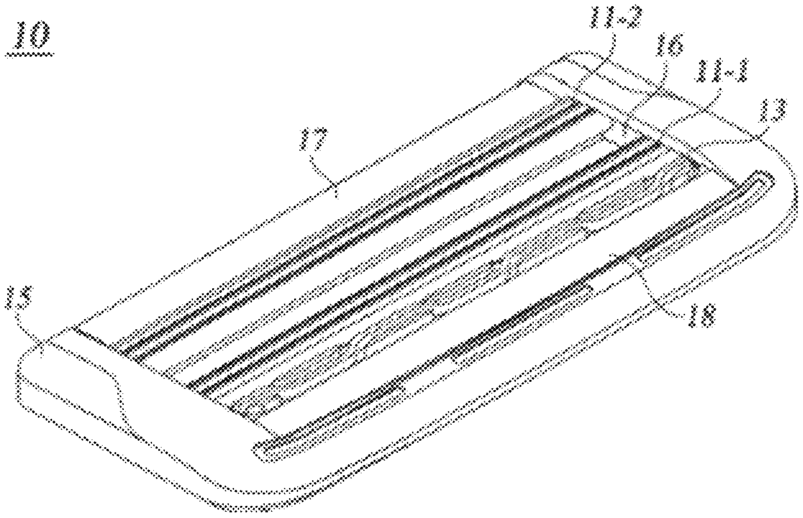
FIG. 9 is a perspective view of the razor assembly in accordance with yet another embodiment of the present disclosure.

The heating bar 28 is disposed on top of the handle assembly 20. Meanwhile, the heating bar 28 may be configured to be removable from the handle assembly 20. In this case, replacement of the heating bar 28 in the event of a failure becomes easier. As shown in FIG. 7A, the handle assembly 20 may also include a handle top part 40 positioned at an upper part of the handle assembly 20. In some embodiments, as shown in FIG. 7A, the handle top part 40 may include both the heating bar 28 and the connector 25. The handle top part 40 may include a skin facing surface configured to be exposed to a skin of a user during shaving. As shown in FIG. 8, an example of the skin facing surface may include an upper surface 28*a* of the heating bar 28 that is configured to contact the skin of the user during shaving.

Since the heating bar 28 is configured to be heated by the induction coil 33 to be described below, it is preferable that it fully or partially contains a conductive material or an electrically conductive object.

Meanwhile, when the handle assembly 20 is coupled with the cartridge 10, at least a portion of the heating bar 28 may be disposed on the front surface of the cartridge 10. By disposing a portion of the heating bar 28 on the front surface of the cartridge 10, the heating bar 28 comes into contact with the user's skin during shaving.

To dispose the heating bar 28 on the front surface of the cartridge 10, at least a portion of the heating bar 28 may be disposed in the empty space 16 between the first blade 11-1 and the second blade 11-2. In this case, at least a portion of the heating bar 28 may be disposed in the central area of the cartridge 10.

Figure 7B:
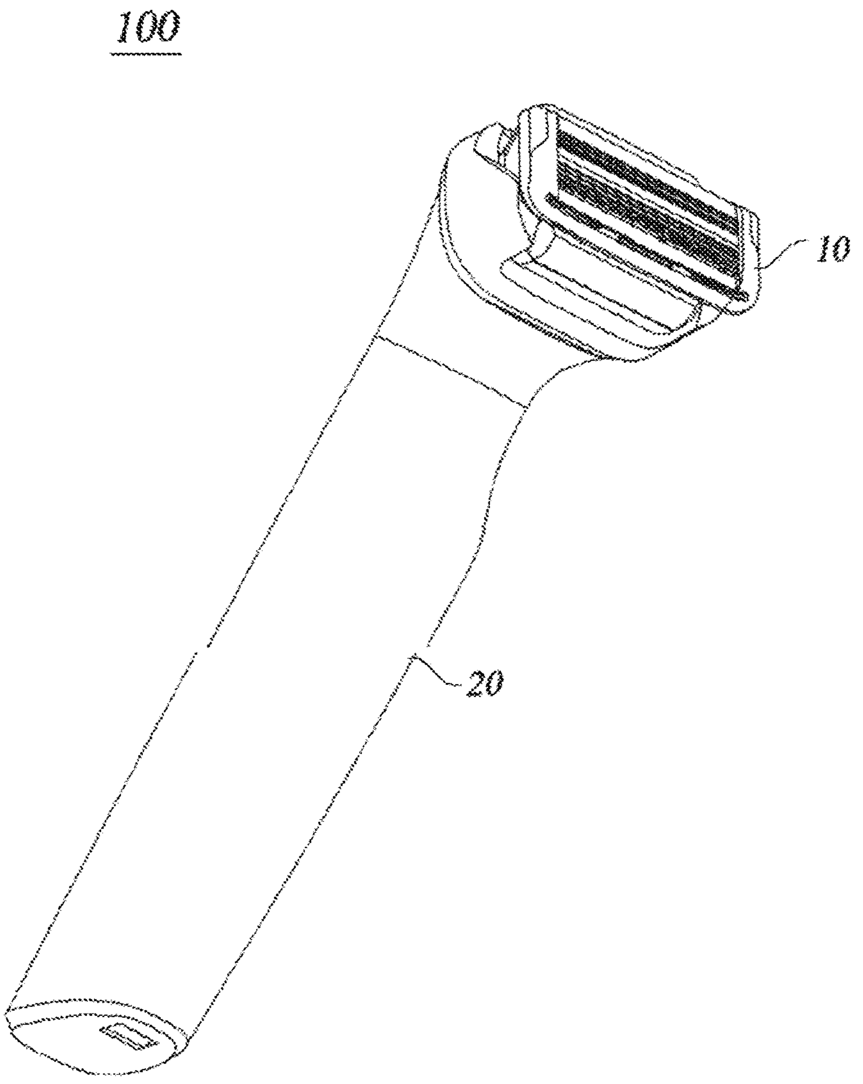
FIG. 7B is a perspective view of the razor assembly in accordance with yet another embodiment of the present disclosure.

The induction coil 33 is configured to heat the heating bar 28 in a contactless manner under or near the heating bar 28. The induction coil 33 may be at least one. In FIGS. 7A to 8, the number of induction coil 33 is shown to be one, but may be two or more.

The induction coil 33 may be a circular fan-type induction coil as shown in FIG. 7A, but is not necessarily limited thereto.

As the induction coil 33 heats the heating bar 28, the temperature of the heating bar 28 may rise. The temperature range of the heating bar 28 may be equal or greater than the temperature range of the cartridge 10.

If at least a portion of the heating bar 28 is disposed on the front surface of the cartridge 10, the heating bar 28 which is warmed up during shaving may come into contact with the user's skin, thereby providing comfort to the user. The warmth of the heating bar 28 during shaving can make the user feel better, thereby allowing the user to experience more comfortable shaving.

For example, the empty space 16 may be formed to open only towards the rear of the cartridge when a shaving plane on the front surface of the cartridge 10 corresponding to the empty space 16 has a thin film (not shown).

Meanwhile, when the shaving plane on the front surface of the cartridge 10 corresponding to the empty space 16 has a thin film so that the empty space 16 opens only towards the rear of the cartridge. Once the heating bar 28 is assembled inside the empty space, the front surface of the heating bar 28 may be in contact with the rear surface of the thin film, and the front surface of the thin film may be in contact with the user's skin. The thin film prevents a direct contact between the surface of the heating bar 28 and the user's skin, thereby reducing surface contamination of the heating bar 28 and effectively transferring heat from the heating bar 28 to the user's skin. The thin film may have a thickness and may be made of materials that allow heat from the heating bar 28 to be transferred to the user's skin.

Meanwhile, to facilitate the heat transfer, at least some other parts of the heating bar 28 may be disposed adjacent to the induction coil 33. For example, at least a portion of the heating bar 28 may be disposed under at least one blade 11 and adjacent to the induction coil 33, but is not necessarily limited thereto.

In addition, in order to ensure that the heating bar 28 is stably supported by the handle assembly 20, the handle assembly 20 may additionally include a support body (not shown). The upper part of the support body is configured to allow the heating bar 28 to be detachable. If the heating bar 28 is mounted on the support body, the support body may support the lower portion of the heating bar 28.

To prevent the support body from obstructing the heating bar 28 being heated by the induction coil 33, the support body may fully or partially contain a conductive material or an electrically conductive object, as the heating bar 28.

Referring to FIGS. 7A to 8, the support body is configured to surround at least a part of the induction coil 33 for stable support of the heating bar 28, but is not necessarily limited thereto.

Meanwhile, the induction coil 33 may heat not only the heating bar 28, but also at least one of the blades 11, guard 13, trimmer, and blade fixation clip. In this case, at least one of the guard 13, trimmer, and blade fixation clip may be configured to contain conductive materials or electrically conductive objects. Further description on the induction coil 33 heating up a configuration other than the heating bar 28 is not provided since it may be the same as the description in the previous embodiment.

When the cartridge 10 includes the heating frame 18, the induction coil 33 is configured to heat the heating frame 18 in a contactless manner as well. If the heating bar 28 is disposed in the central area of the cartridge 10, shaving performed by the first blade 11-1 may take place before warmth is delivered to the skin.

When the cartridge 10 includes the heating frame 18, the heating frame 18 may heat up and provide warmth directly to the skin before shaving by the first blade 11-1, or it may deliver warmth from the heating frame 18 by disposing rubber guard, comb, or lubricant on skin.

In addition, when the cartridge 10 includes the heating frame 18, the heating frame 18 can be disposed not only in front of the first blade 11-1, but also in the rear of the second blade 11-2, or in more than one places inside the cartridge 10.

Meanwhile, the heating bar 28 and the induction coil 33 may be pivotably attached inside the handle assembly 20. For example, a heating bar 28 and an induction coil 33 may be pivotable relative to each other around a pivot axis parallel to the lateral direction which at least one blade 11 is housed in the cartridge 10. However, this is not necessarily limited, and heating bar 28 and induction coil 33 may be pivotable relative to each other around the longitudinal parallel pivot axes perpendicular to the lateral direction.

In addition, the grip portion 26 and the induction coil 33 may be pivotably attached inside the handle assembly 20. For example, grip portion 26 and induction coil 33 may be pivotable to each other around pivot axes parallel to the lateral or longitudinal direction.

In addition, the handle assembly 20 and the cartridge 10 can be pivotably coupled to each other. For example, the handle assembly 20 and the cartridge 10 may be pivotable to each other around a pivot axis parallel to the lateral or longitudinal direction. In this case, the pivot may be done by the connector 25 being pivotably coupled to the cartridge 10, but is not necessarily limited to this.

Meanwhile, the razor assembly 100 may be configured to enable pivot between the heating bar 28 and induction coil 33, pivot between the grip portion 26 and induction coil 33, and pivot between handle assembly 20 and cartridge 10, but is not necessarily limited to one or two pivots.

Hereinafter, the relationship between the head portion 24, the connector 25, the heating bar 28, and the induction coil 33, which can implement the above pivot motion, will be provided.

The heating bar 28 and induction coil 33 may be configured to be included in the connector 25 and the head portion 24, respectively. In this case, the connector 25 and the head portion 24 may be configured to be pivotable around the cartridge 10 and grip portion 26, and therefore the heating bar 28 and induction coil 33 may be pivotable relative to each other inside the handle assembly 20.

Here, the pivot axis may be an axis parallel to the lateral direction, or may be an axis parallel to the longitudinal direction perpendicular to lateral direction.

In addition, the connector 25 and the head portion 24 may be separately pivotable, and pivot shafts may be the same or may be different.

For example, if the connector 25 pivots around a pivot axis parallel to the lateral direction, the head portion 24 may pivot around a pivot axis parallel to the lateral direction or a pivot axis parallel to the longitudinal direction, independent from the connector 25.

On the contrary, when the connector 25 pivots around a pivot axis parallel to the longitudinal direction, the head portion 24 may pivot around a pivot axis parallel to the longitudinal direction, or a pivot axis parallel to the lateral direction, independent from the connector 25.

Each of the connector 25 and head portion 24 may not necessarily be pivotable around the cartridge 10 and the grip portion 26.

For example, only the connector 25 may pivot around the cartridge 10 or grip portion 26 while the head portion 24 is not pivotable, and therefore only the heating bar 28 may pivot around the cartridge 10 or grip portion 26.

Conversely, only the head portion 24 may pivot around the cartridge 10 or grip portion 26 while the connector 25 is not pivotable, and therefore only the induction coil 33 may pivot around the cartridge 10 or grip portion 26.

Meanwhile, both the heating bar 28 and the induction coil 33 may be configured to be included in the connector 25. In this case, the connector 25 and the head portion 24 may also be configured to be pivotable around the cartridge 10 and grip portion 26, respectively. However, only one of the connector 25 or the head portion 24 may be configured to be pivotable.

Heating bar 28, induction coil 33, and connector 25 may all be included in the head portion 24. In this case, the head portion 24 may be configured to be pivotable around the cartridge 10 or grip portion 26, and pivot axis may be parallel to longitudinal direction or lateral direction.

As described above, in the razor assembly 100 of an embodiment of the present disclosure, the electric power source, the PCB, and the induction coil 33 are encapsulated within the handle assembly 20. Therefore, as long as the cartridge 10 includes a conductive object that can be heated by electromagnetic induction, heat is generated inside the conductive object itself by eddy currents instead of a directly electrically connected external heat source. Thus, in some embodiments, the cartridge 10 may be any type that can be coupled to the handle assembly 20 where at least the blades 11 of the cartridge 10 are composed of a conductive material which can be heated by electromagnetic induction.

For the razor assembly according to the present disclosure, all of the electric power source, printed circuit board (PCB), and at least one induction coil are located at the handle assembly, and thus, no electrical component is required in the cartridge. Alternatively, the at least one induction coil may be located at the connector in case the connector is designed not to be a part of the handle assembly, but is configured to be coupled to the handle assembly. Moreover, the connector may be integrated into the cartridge.

Inductive heating of the cartridge is made possible by at least one electrically conducting object at the cartridge which can be heated by electromagnetic induction generated by the at least one induction coil. In this way, there is an advantage in that, there need not be any contact between the handle assembly and the cartridge, which may be important for safety and durability issues. Thus, various types of cartridges that can be coupled to the handle assembly may be manufactured independently of the handle assembly without being restricted by a design or manufacturing requirement to provide an electrical contact for heating of the cartridge.

Embodiments of the present disclosure have been described above with reference to the accompanying drawings, but those of ordinary skill in the art to which the present disclosure pertains should understand that the present disclosure may be practiced in other specific forms without changing the technical idea or essential features thereof. Therefore, the embodiments described above are illustrative in all aspects and should not be understood as limiting.

What is claimed is:

1. A razor assembly, comprising:

a cartridge including at least one blade, the cartridge comprising a front surface where the at least one blade is exposed and a rear surface opposite to the front surface; and a handle assembly configured to be detachably coupled to the cartridge, wherein the handle assembly includes:

a power source;

a handle top part positioned at an upper part in an extending direction of the handle assembly, the handle top part comprising a skin facing surface configured to be exposed to a skin of a user during shaving, the skin facing surface disposed closer to the front surface than the rear surface, the skin facing surface of the handle top part configured to contact the skin of the user during shaving such that the skin facing surface provides heat to the skin of the user; and a heating element connected to the power source and configured to simultaneously heat at least the skin facing surface of the handle top part and the at least one blade in a contactless manner such that the heated skin facing surface of the handle top part and the heated at least one blade together provide heat to the skin of the user during shaving, wherein the at least one blade includes at least one first blade and at least one second blade, and wherein at least a portion of the handle top part is configured to be disposed in an empty space between the at least one first blade and the at least one second blade.

2. The razor assembly of claim 1, wherein the contactless manner comprises a high-frequency induction heating manner.

3. The razor assembly of claim 1, wherein the heating element comprises an induction coil.

4. The razor assembly of claim 1, wherein:

the handle assembly is coupled with the cartridge in a direction from the rear surface to the front surface.

5. The razor assembly of claim 1, wherein the cartridge includes:

a guard disposed in front of the at least one blade, a cap disposed in rear of the at least one blade; and a heating frame disposed in front of the guard.

6. The razor assembly of claim 5, wherein:

the cartridge further includes a clip configured to fix the at least one blade, and the heating element is configured to simultaneously heat at least two of the handle top part, the at least one blade, the guard, the cap, the clip, or the heating frame in a contactless manner.

7. The razor assembly of claim 1, wherein the handle top part is detachable from the handle assembly.

8. The razor assembly of claim 1, wherein the handle assembly includes a support body that supports a lower portion of the handle top part and surrounds at least a portion of the heating element.

9. The razor assembly of claim 1, wherein the handle assembly comprises a handle, and wherein the handle top part is removably coupled to the handle such that the handle top part is replaceable.

10. The razor assembly of claim 1, wherein the heating element comprises an induction coil and the handle top part comprises an electrically conductive material such that heat is generated by eddy currents in the electrically conductive material.

* * * * *